United States Patent [19]
Bergljung et al.

[11] Patent Number: 6,114,990
[45] Date of Patent: Sep. 5, 2000

[54] DEVICE FOR REAL TIME SIMULATION

[75] Inventors: Peter Bergljung, Norrköping; Tommy Bergström, Linköping, both of Sweden

[73] Assignee: Saab Dynamics AB, Linkoping, Sweden

[21] Appl. No.: 09/269,064

[22] PCT Filed: Sep. 16, 1997

[86] PCT No.: PCT/SE97/01566

§ 371 Date: Mar. 18, 1999

§ 102(e) Date: Mar. 18, 1999

[87] PCT Pub. No.: WO98/12687

PCT Pub. Date: Mar. 26, 1998

[30] Foreign Application Priority Data

Sep. 18, 1996 [SE] Sweden .................................. 9603411

[51] Int. Cl.[7] .................................................. H04B 7/185
[52] U.S. Cl. .............................. 342/357.09; 342/357.06; 342/357.08; 701/213
[58] Field of Search .................. 342/357.01, 357.06, 342/357.08, 357.09, 457; 701/213, 215

[56] References Cited

U.S. PATENT DOCUMENTS 5,325,302  6/1994  Izidon et al. .
5,506,587  4/1996  Lans .
5,867,804  2/1999  Pilley et al. ............................. 701/120

FOREIGN PATENT DOCUMENTS

0732677  9/1996  European Pat. Off. .

Primary Examiner—Thomas H. Tarcza
Assistant Examiner—Dao L. Phan
Attorney, Agent, or Firm—Pollock, Vande Sande & Amernick, R.L.L.P.

[57] ABSTRACT

A device for simulating in real-time a path of an object in a three-dimensional coordinate system. The device includes at least a first unit and a second unit each provided with a GPS receiver for receiving position and timing signals respectively from at least four GPS satellites, a transmitter/receiver for communication between the first unit and the second unit in the VHF or UHF frequencies, and a communication computer having memory capacity and providing a connection between the GPS receiver and the transmitter/receiver. A simulation computer is included at least with the first unit. The simulation computer communicates with the communication computer and simulates with an event driven protocol a path in the coordinate system of the object and communicating the path to the second unit. The communication computer controls the communication through the transmitter/receiver according to an STDMA method.

19 Claims, 7 Drawing Sheets

DEVICE FOR REAL TIME SIMULATION

FIELD OF THE INVENTION

The present invention relates to a device for real-time simulation of the position of a possibly fictitious object in a three-dimensional coordinate system. The device includes at least a first unit and a second unit, each one provided with a GPS-receiver for receiving position and time signals respectively from at least four satellites. The device also includes a transmitter/receiver for communication between the first and second unit, preferably within the VHF- or UHF-radio frequencies. Additionally, the device includes a communication computer having memory capacity which connects the GPS-receiver and the transmitter/receiver.

BACKGROUND OF THE INVENTION

For a long time, various devices for military simulation of battle simulations have been used. For example such devices can be concerned with laser methods for simulating realistic paths of projectiles. Then, usually, the considered projectiles have been fired from a vehicle located on the ground to a target, also located on the ground. However, there has been a lack of devices which at a reasonable cost simulate battle situations in which at least one part is located in space. This is even more true in those cases when the two parts are located there.

In recent years, the appearance of GPS-systems, i.e. Global Positioning Systems, which include satellites, the position of which in relation to the earth is accurately determined, has resulted in the possibility of a very accurate determination of the position of objects on the ground and also of objects in space.

U.S. Pat. No. 5,325,302 discloses a device for simulating in real time the position of an object in a three dimensional co-ordinate system, including a first and a second unit, using a GPS-system. U.S. Pat. No. 5,825,302 discloses a standard radio protocol for simulation, where the protocol utilizes a high link bandwidth and a high frequency.

SUMMARY OF THE INVENTION

The object of the present invention is thus to provide a device of the kind which is mentioned in the introduction and which is suited to many applications and has a relatively low cost when used.

According to the present invention, such a device is primarily characterized in that at least the first unit contains a simulation computer communicating with a communication computer and simulating the position in the coordinate system and in time of an object and communicating this information to the second unit.

Such a device works well in the case where the number of objects is limited, i.e. if not more than some 3–4 objects are considered. However, a method developed in recent years, the so called STDMA, i.e. "Self-organizing Time Division Multiple Access", allows, as applied in the actual context, that a very large number of objects can participate in the simulation. This method is described in International Patent Application PCT/SE92/00485 having publication number WO 93/01576, published Jan. 21, 1993, and in other documents. In a preferred embodiment of the invention thus, the communication computer in the first and second units is provided with a time base which is exactly controlled by timing signals from the satellites. The said time base defines time blocks, which are standardized, are capable of being numbered and form a common, exact and predetermined repeated maximum frame. The device also includes means for using a free time block in each maximum frame, and for automatically therein transmitting a position signal between a transmitter and receiver using the selected radio frequency. The details of the STDMA-method are exhaustively described in International Patent Application PCT/SE92/00485 but are described in a summarizing way in the present context.

The STDMA method provides a position indicating system comprising a population of simultaneously active movable stations, which each sense their geographical positions through the reception of signals from geometrically distributed transmitters having known positions, and wherein each participating station has a transmitter for sending out in a radio channel common to the system of signals indicating own identities and geographical positions, and memory means for storing of signals from other participating movable stations, and whereby according to the invention each station has handling means, as a computer, comprising a time base which is precision controlled by time signals received from said geometrically distributed transmitters, the time base defining time blocks standardized thereto and enumerable in a predetermined, repetitive maximum frame, the memory means registering free time blocks where no transmission is perceived, means for selecting one of the free time blocks for own repetitive transmission of identity and position therein, the transmitter working in a frequency having a range substantially confined to the line of sight, and preferably means for randomly switching of a used one of the time blocks for another block registered as free. According to a preferred embodiment, each station also determines traffic density in its environment and decides in function thereof how many time blocks are to be used in successive frames.

In a representative case of the STDMA method, and depending on the circumstances, the exchanged information in each transmission may be 150–200 bits. With a transmission speed of 9600 band, such a message takes a maximum of slightly over 20 ms. to switch from reception mode to transmission mode takes time, 1–3 ms, and since a station must listen to all time blocks where it is not transmitting itself, it is necessary to arrange such dead time first in each time block, compensating for speed of light and making it possible for a transmitting station to listen to an eventual message in the next following time block. A suitable length of the time block could then be 26.66 ms, so that each minute comprises 2250 time blocks. For practical reasons, it is suitable to let a certain period, e.g. one minute, be a kind of maximal frame.

Each station listens to the traffic in the allocated frequency and registers in its memory which time blocks are free, and also the position etc. for those stations, the signals of which are detected. This information is automatically treated in order to determine how near the neighbors are and how often the own transmission shall be made. Those who have no near neighbors do not need to transmit often, e.g. only twice or a few times per minute.

The information may also be treated for showing on a monitor. In a suitable scale, then, the surrounding stations may be shown, with a vector, the length of which shows speed, and with numbers showing altitude, where the system is utilized in air traffic control. In contradiction to ordinary radar, this image or map is referred to a fixed coordinate system (plotted). This simplifies greatly the ocular analysis of eventual risks of collision. In some cases, for instance, when the object is to keep order on serving vehicles on an airport for avoiding collisions, it is possible to leave out the monitor in each vehicle, as it is then sufficient if the central control can survey the system on a monitor.

As mentioned, it is envisaged that a station may be active in an autonomous mode or in a ground station ordered mode. In autonomous transmission mode, the individual station selects a time block which is not found occupied in previous listening. In order to avoid that more than one station appropriates the same time block and blocks it, something none of them can perceive, being unable of simultaneous transmission and reception, they systematically change the selection of time block, at frequent intervals, using a random number generator (pseudo-random algorithm). For instance, the station may jump for a randomly determined number of occupied time blocks to a free time block. If, as previously explained, the jumping is previously announced and the new time block thus preempted, mutual interference can be practically excluded.

The ordered mode is normally set by an order from a fixed station, e.g. from the air control of an airfield (ground station ordered mode). The fixed station has the same time base and can call movable stations in a free time block, allocating individual time block series to them and making them stop antonymous transmitting, transmitting then only in said time block series. The air control station can then obtain positional information from the selected stations in arbitrary intervals. It is suitable to limit the available time blocks for the ordered mode to, say, 75% of the whole maximum frame, but even with this limitation, there are available in the above-indicated example some 1685 time blocks per minute. Even if as many as 50 aircraft are to be kept accurate track of, they can then transmit with intervals of about 2 seconds. This should be compared to standard rotating radar systems, the antennas of which rotate slower than some 6–8 seconds per revolution. This example is very schematic, as aircraft are normally transmitting with different rates, and the highest rate is necessary only for aircraft very near to an airport.

The following provides an example of the STDMA method. A movable station shown in FIG. 1 comprises a unit 1 which keeps trace of traffic, a presentation computer 2 and a monitor 3 on which a pilot may survey traffic and observe it visually. Unit 1 comprises a satellite receiver 4 for the GPS system, which receives signals from a plurality of satellites, which signals comprise time signals and orbital elements. In principle, the invention is not limited to the use of the GPS satellites. Also, the Russian GLONASS system or a combination of GPS and GLONASS can be used to determine the position of a movable object. The Such GPS units are commercially available, e.g. the Magnavox MX 4200 from—Magnavox Corp., USA. Therefore, nothing more needs to be said than that such a unit may deliver the geographical position in longitude and latitude with high precision, altitude with somewhat less precision, and UTC time with very high precision. Further, information on speed and course is available. This information is available for the communication processor 5, which in its turn is connected to a transmitter-receiver 6. The satellite receiver 4 works at 1.4 GHz, whereas the transmitter-receiver works at 141 MHz.

Figure 2:
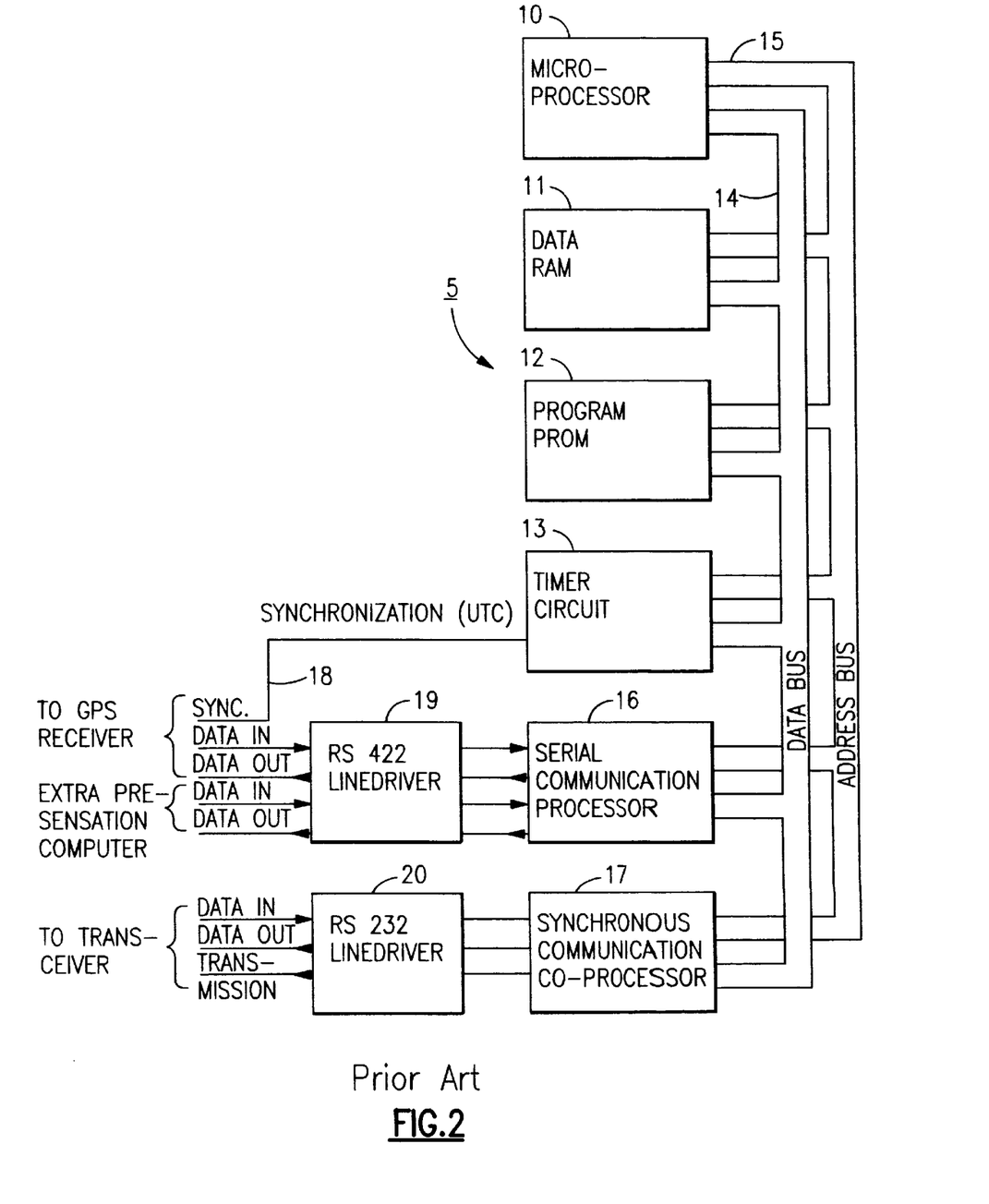
FIG. 2 shows a communication processor for a station.

The exemplified communication processor is shown more in detail in FIG. 2.

The following information is sent out at each transmitting event.

1. A start flag and a code indicating spontaneous emission mode or ordered transmission mode. (8 bits)

2. The identity code of the station. (48 bits, 8 signs each of 6 bits)

3. The position in longitude and latitude. (24 bits latitude in $1/1000$ min; 25 bits longitude in $1/1000$ min)

4. Speed, 11 bits, 2 Kt steps.

5. Flight direction, 12 bits, tenths of degrees.

6. Altitude, 12 bits, 16 Ft steps.

7. Time, 6 bits, when the transmitted values were actual (0–60 sec.).

8. Status bits, declaring advance notice of change of blocks etc.

9. A control check sum.

10. An end flag.

As apparent from FIG. 2, the communication processor 5 includes a microprocessor 10, a RAM 11, a program memory PROM 12 and a timer circuit 13, all cooperating via a data bus 14 and an address bus 15. For connection with further units, there is a serial communication circuit 16, and for transmission and reception a synchronous communication co-processor 17. The microprocessor may be a HD64180 chip (Hitachi), and the co-processor a Siemens SAB 82525 (version VA3).

Timer circuit 13, which keeps trace of the time multiplex, is fed from the GPS unit 4 (FIG. 1) with signals time synchronized in UTC via a lead 18 (FIG. 2), receiving a time signal per second and further time information from the GPS system. Drivers 19 and 20 complete for obtaining suitable matching of signals.

The RAM memory 11 stores a catalogue of all received signals from other stations, so that identifies and positions are stocked and updated. All receivable participants will be heard within the maximal frame, and in order not to fill the memory with actual participants, such participants are removed if they are not heard again within a prescribed time. Further, information is stored about which time blocks are free. The communication processor also determines the repetition rate of emission, dependent on density of traffic or on order from a central ground station.

Figure 1:
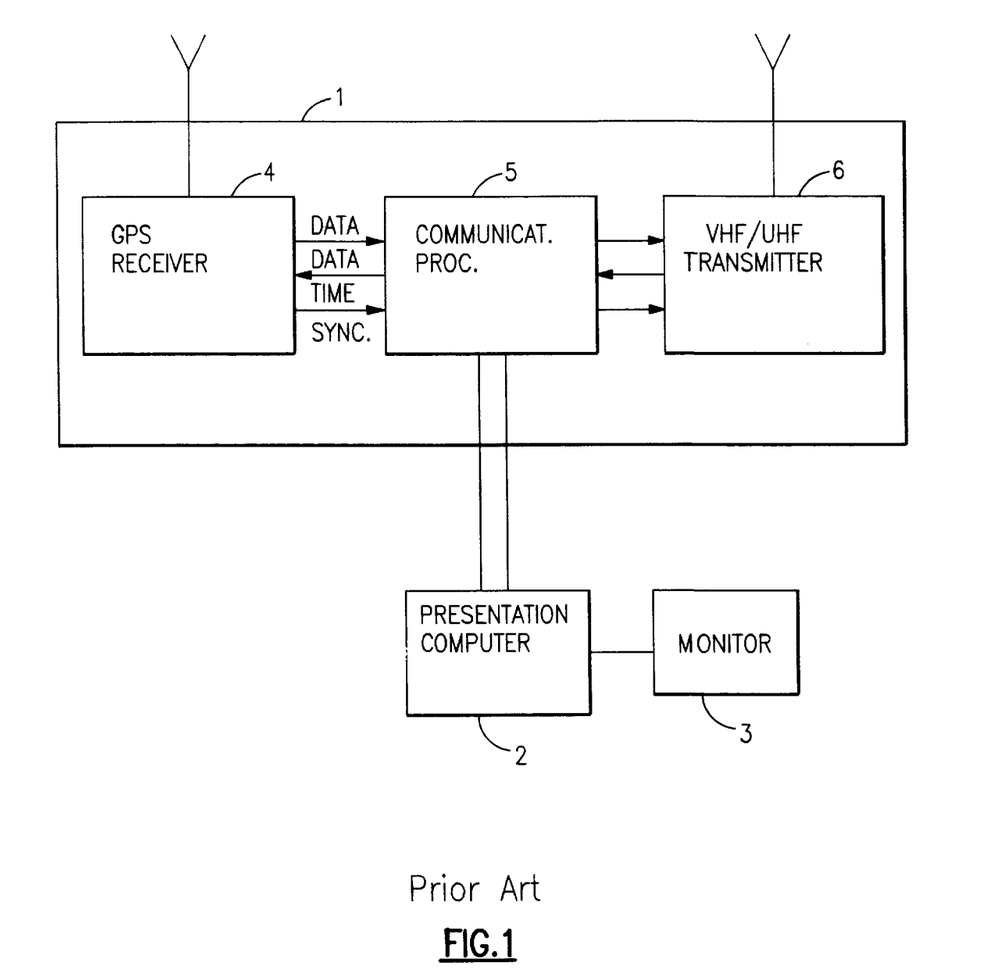
FIG. 1 shows a schematic block diagram of a station according to the invention.
Figure 3:
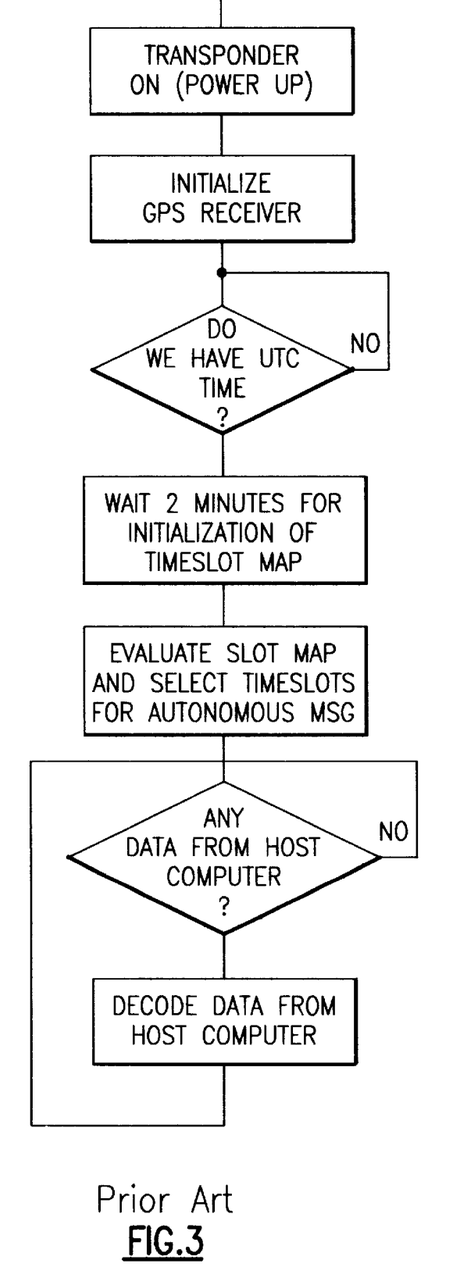
FIGS. 3–7 show respective flow diagrams for an exemplary computer program.

The microprocessor 10 works with software comprising a real time operative system, driving in different priorities a number of different programs:

Program 1 reads and decodes data from a host computer, which may be computer 2 in FIG. 1 or, in case of a fixed control station, its own host. A flow diagram for this program is shown in FIG. 3.

Figure 4:
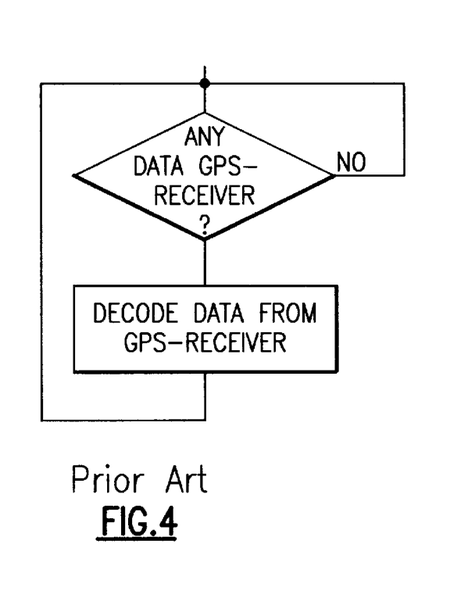

Program 2 reads and decodes data coming from the GPS receiver 4, according to flow diagram in FIG. 4.

Figure 5A:
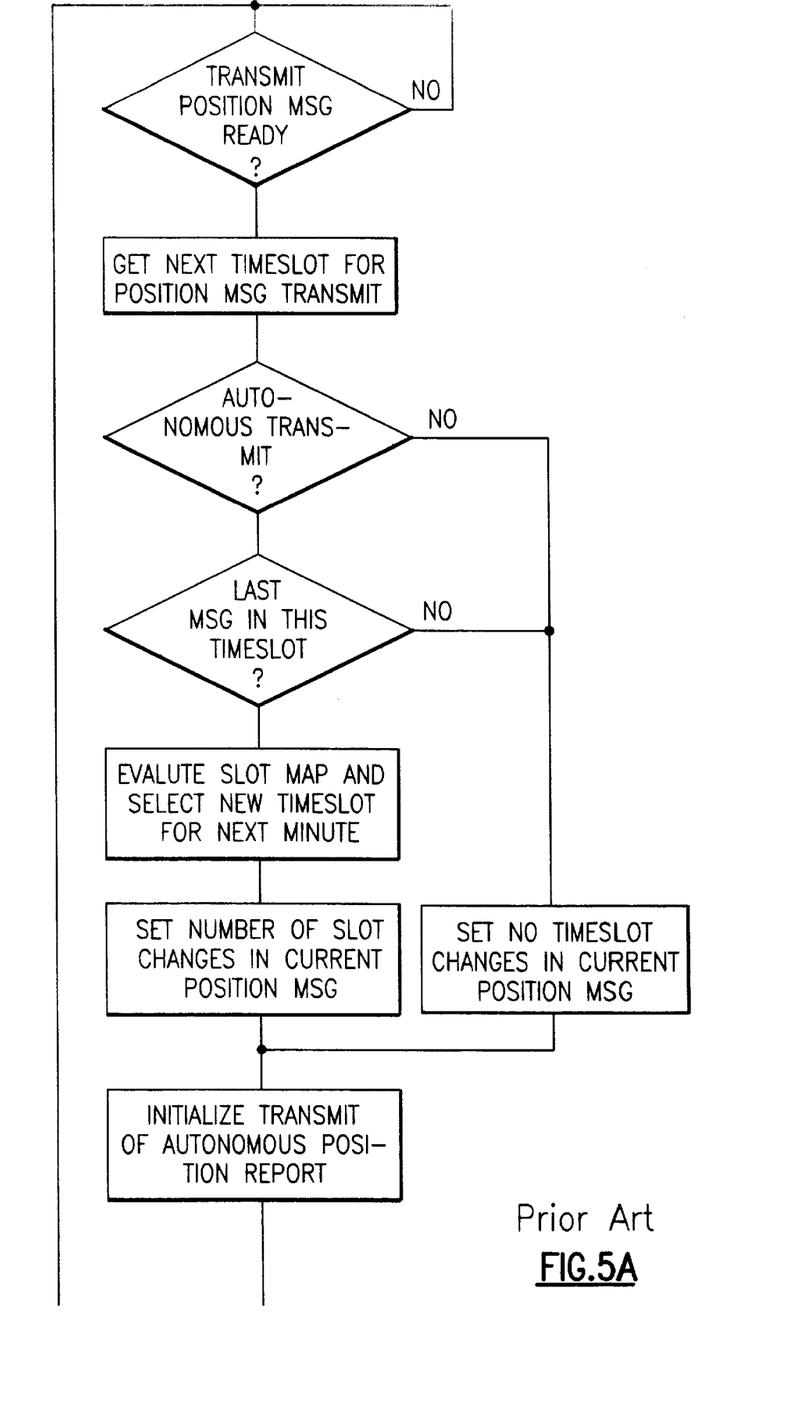
Figure 5B:
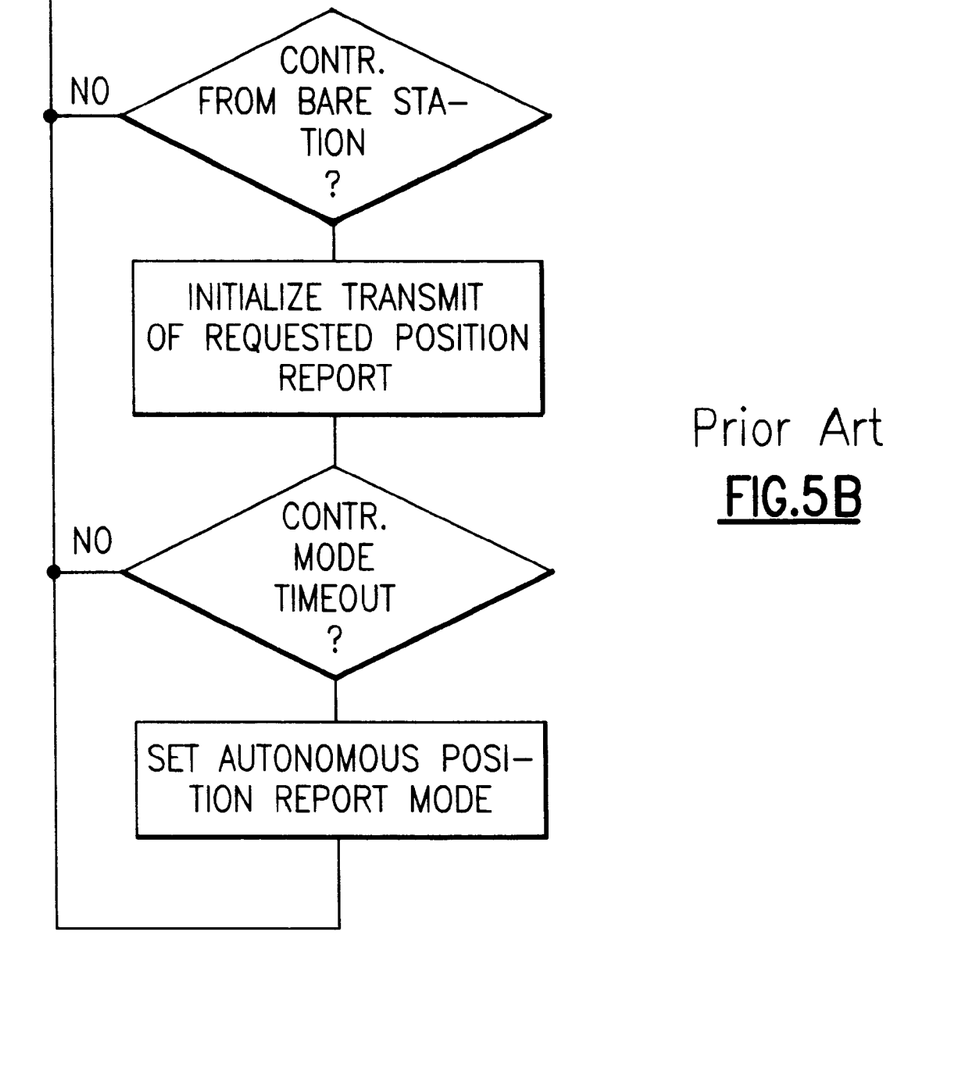

Program 3 generates messages and manages transmission and other control features for the transceiver 6 (FIG. 1), according to flow diagram shown in FIG. 5.

Figures 6, 7:
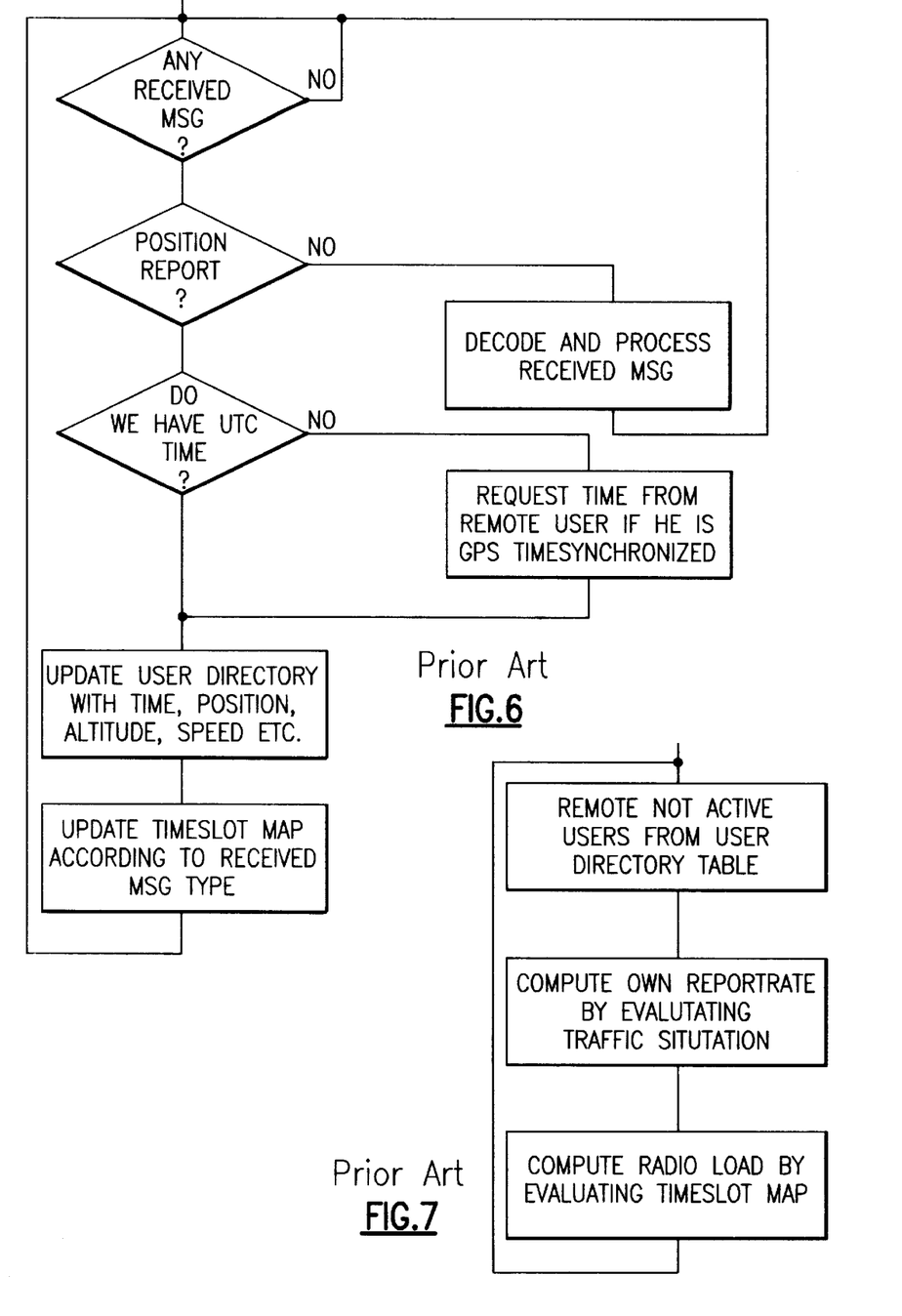

Program 4 supports the reception and decoding of received data messages from the transceiver, and updates the directory of the other users including mapping of time blocks or time slots as occupied, according to the flow diagram of FIG. 6.

Program 5 keeps the user directory updated by receiving participants who have stopped being heard, either because they have landed and shut off or because they are now beyond reach. Further, the own report rate is calculated, e.g. by calculating how many neighbors are within a predetermined distance. A lowest transmission rate is predetermined and no to be fallen below of. Further, the radio channel load is determined. A flow diagram of program 5 is shown in FIG. 7.

Presentation computer 2 fetches its data from the catalogue in the memory of the communication processor and manipulates the information, in part for the needs of the monitor, and in part for enabling the signaling to the pilot for action which may be needed. As during long hauls, the level and frequency of stimuli are low, it is difficult to keep full attentiveness, and it is therefore very valuable to be able to make precise signals demanding attention, according to certain criteria (another station nearby, on its way to the own station, etc.).

For proper functioning, it is particularly important for all stations to dispose of a time base having good security. In the example, this is accomplished in the timer circuit 13, which, receiving once per second a time pulse from the GPS unit, can synchronize the clock frequency of the processor within the demanded accuracy, that is, so that the time blocks assigned or appropriated can be held.

It is also possible, if for some reason the GPS receiver of a station lapses, to take help from the time signals received from neighboring stations, including ground stations. The signals received by radio may be used as another plurality of geometrically distributed transmitters having known positions. The accuracy of the position would of course suffer. It is then preferred to include in the message an information that the position information is less accurate. Should the GPS satellites fail for some reason, an unlikely event, the system may still work to a limited degree as long as the plurality of ground stations can keep a common time, e.g. with accurate clocks which might be calibrated from a chosen satellite out of the geostationary satellites in existence.

It is necessary, in order to make the present system useful as a worldwide system, that a common protocol is used for frequencies to be used as well as for the disposition of for example time blocks and frames.

However, the device according to the invention can be also used for collision warnings between at least a first unit and a second unit, in civil and military contexts. In that case, the device is characterized in that the simulation computer of the first unit simulates both the position of the first unit in the coordinate system and in time to a first table. The simulation computer also simulates, as guided by data communicated as to position and time for the second unit, the position of the second unit in the coordinate system in time to a second table, whereupon the simulation computer compares the first and the second tables and issues, for agreeing data as to position and time, a warning signal.

BRIEF DESCRIPTION OF THE DRAWINGS

The invention is in the following described in greater detail with reference to the accompanying drawings, in which FIG. 9 shows a principle diagram of a simulation computer, and FIG. 10 schematically illustrates the use of the device.

DETAILED DESCRIPTION OF THE INVENTION

Figure 8:
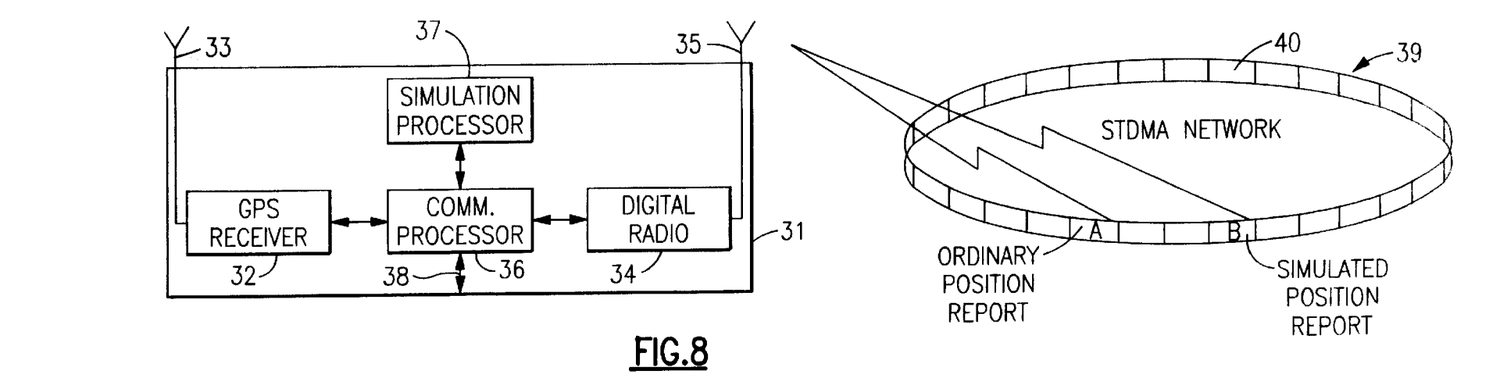
FIG. 8 shows a principle diagram of a unit in the device according to the invention.

In this context a unit according to the invention is called a transponder, and it is in FIG. 8 denoted by 31. It contains a GPS-receiver, denoted by 32, for receiving through an antenna 33 position and timing signals respectively from at least four satellites, and in practical cases still more satellites. The GPS-system is supplemented with transmitters positioned on the ground in order to achieve full performance. Furthermore, in the transponder a digital transmitter/receiver 34 is included for communication through an antenna 35 between this unit and other units, i.e. transponders, in this case within the VHF- or UHF-radio frequencies. A communication computer 36 having memory capacity is connected to the GPS-receiver 32 and the transmitter/receiver 34. A simulation computer 37 is connected to the communication computer. Input terminals of the latter and the simulation computer are denoted by 38. The communication computer is arranged to control the communication through the transmitter/receiver 34 according to the STDMA-method mentioned above. A repeated maximum time frame is schematically illustrated at the numeral 39. It comprises in the example illustrated 60 seconds, divided in 9000 time blocks, one of which being denoted by 40, each block thus comprising 6.67 ms. As described in greater detail in the cited International Patent Application PCT/SE92/00485 a large number of transponders can communicate their positions through an automatic allocation of the time blocks.

Figures 9, 10:
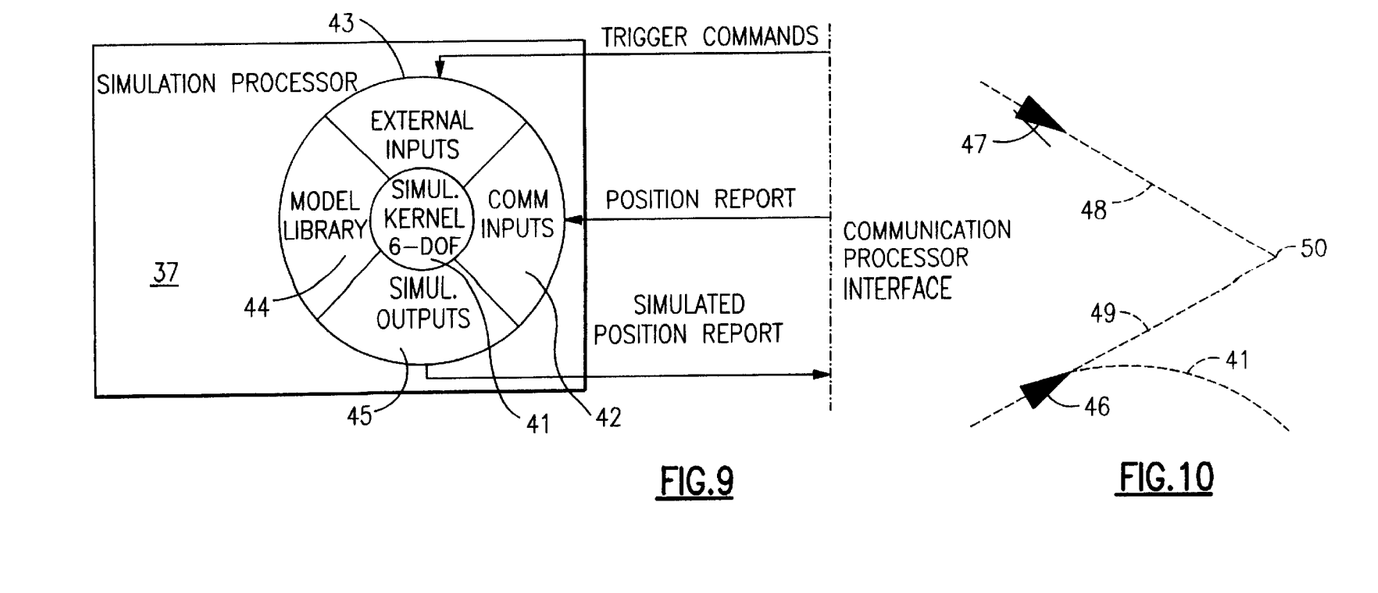

The construction of the simulation computer, i.e. its simulation protocol, is schematically illustrated in FIG. 9. The simulation core consists of a numerical integration schedule having six degrees of freedom, both for continuous and discrete dynamic systems. Data such as position reports from the communication computer are stored in an event input list denoted by 42. The event handler 43 is an input filter through which events pass before being processed in the simulation core. The model library 44 contains specific information on the simulation objects, e.g. robots such as Sidewinder, AMRAAM, RBS-15, Maverick, etc. The event output list 45 transmits data to the communication computer 46.

In FIG. 10 a first aircraft is denoted by 46 and a second aircraft is denoted by 47, which are both provided with devices according to the invention, i.e. transponders. The first aircraft then continuously receives in real-time information on the path 48 of the second aircraft in the three-dimensional coordinate system. In the transponder of the first aircraft now a firing of a robot along a path 49 is simulated, which is calculated to result in hitting a robot at a point 50 of impact. The information on the path 49 is transmitted to the transponder in the second aircraft and the pilot therein will, as guided by the information, change his path, so that a hit is avoided. The first aircraft then deviates along a path 51.

FIG. 10 can also illustrate the use of the device for collision warnings. In that case the two airplanes transmit through their transponders information to each other on their path in the three-dimensional coordinate system, as simulated forward in time, so that the simulation computer of each transponder stores first and second tables listing the positions of their own aircraft and of the other aircraft respectively in the three-dimensional coordinate system in time, which data are illustrated by the paths 48 and 49. By comparing the position and time data found in the two tables in the simulation computer the computer issues a warning signal in the case of intersecting positions and time data (as is indicated by the numeral 50 in FIG. 10) and issues a warning signal, so that at least one of the aircraft can change its path, as indicated by the numeral 51 in FIG. 10.

What is claimed is:

1. A device for simulating in real-time a path of an object in a three-dimensional coordinate system, comprising:

at least a first unit and a second unit each provided with a GPS receiver for receiving position and timing signals respectively from at least four GPS satellites, a transmitter/receiver for communication between the first unit and the second unit in the VHF or UHF radio frequencies, and a communication computer having memory capacity and providing a connection between the GPS receiver and the transmitter/receiver;

a simulation computer included at least with the first unit, the simulation computer communicating with the communication computer and simulating in six degrees of freedom for continuous and discrete dynamic systems with an event driven protocol a path in the coordinate system of the object and communicating the path to the second unit, wherein the communication computer controls the communication through the transmitter/receiver according to an STDMA method.

2. The device according to claim 1, wherein the object is fictitious.

3. The device according to claim 1, wherein both the first unit and the second unit include a simulation computer.

4. The device according to claim 1, wherein the simulation computer includes a numerical integration schedule having six degrees of freedom.

5. The device according to claim 1, wherein the simulation computer stores position reports of at least one of the objects in an event input list.

6. The device according to claim 5, wherein the simulation computer includes an event output list that transmits data to the communication computer.

7. The device according to claim 1, wherein the simulation computer includes an event handler comprising an input filter through which events pass prior to processing by the simulation computer.

8. The device according to claim 1, wherein the simulation computer includes a model library comprising information on simulation objects.

9. The device according to claim 1, wherein the path comprises position and timing.

10. The device according to claim 1, wherein the simulation computer comprises:

an event input list for receiving data regarding position of at least one of the first unit and the second unit;

an event handler for receiving data from the event input list;

a simulation kernel including a numerical integration schedule having six degrees of freedom;

a model library comprising information on simulation objects; and an event output list that transmits data to the communication computer.

11. The device according to claim 1, wherein the first unit and the second unit are arranged on a first aircraft and a second aircraft.

12. The device according to claim 1, wherein the device includes a plurality of units each provided with a GPS receiver, a transmitter/receiver, and a communication computer.

13. The device according to claim 1, wherein the communication computer in the first unit and in the second unit include:

a time base accurately controlled by timing signals from the GPS satellites, the time base defining standardized timing blocks that form a common predetermined repeated maximum time frame and can be numbered; and means for utilizing a free time block in each maximum frame and for transmitting a position signal between the transmitter and the receiver of the units utilizing a selected radio frequency.

14. The device according to claim 1, wherein the device warns of collision between the first unit and the second unit, the simulation computer of the first unit simulates a path of the first unit and the second in the coordinate system and compares the path of the first unit with the path of the second unit and issues a warning if a time and position in the path of the first unit corresponds to a time and position in the path of the second unit.

15. A method for simulating in real-time a path of an object in a three-dimensional coordinate system, the method comprising:

determining positions of a first unit and a second unit in the three-dimensional coordinate system, at least one of the first unit and the second unit being the object, the first unit and the second unit each including a GPS receiver for receiving position and timing signals respectively from at least four satellites, a transmitter/receiver for communication between the first unit and the second unit in the VHF or UHF frequencies, and a communication computer having memory capacity and connecting the GPS receiver and the transmitter/receiver;

simulating in six degrees of freedom for continuous and discrete dynamic systems with an event driven protocol a path of the first unit and a path of the second unit; and communicating with a communication the path from the first unit to the second unit according to an STDMA method.

16. The method according to claim 15, further comprising:

providing the communication computer of the first unit and the second unit with a time base controlled by timing signals from GPS satellites, the time base defining standardized blocks forming a common predetermined repeated maximum frame.

17. The method according to claim 15, wherein the first unit and the second unit are arranged on aircraft and the method warns of potential collisions through the simulating.

18. The method according to claim 15, further comprising:

generating a time base of standardized timing blocks forming a common predetermined repeated maximum time frame, the time base being accurately controlled by timing signals from the GPS satellites;

utilizing a free time block in each maximum frame and transmitting a position signal between the transmitter and the receiver of the units.

19. The method according to claim 15, wherein the method warns of collision between the first unit and the second unit, the simulation computer of the first unit simulates a path of the first unit and the second in the coordinate system and compares the path of the first unit with the path of the second unit and issues a warning if a time and position in the path of the first unit corresponds to a time and position in the path of the second unit.

* * * * *